(12) United States Patent
Sugata

(10) Patent No.: US 11,804,613 B2
(45) Date of Patent: Oct. 31, 2023

(54) METHOD OF CONTROLLING FUEL BATTERY SYSTEM

(71) Applicant: TOYOTA JIDOSHA KABUSHIKI KAISHA, Aichi-ken (JP)

(72) Inventor: Hiroyuki Sugata, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/713,209

(22) Filed: Apr. 4, 2022

(65) Prior Publication Data

US 2022/0320551 A1  Oct. 6, 2022

(30) Foreign Application Priority Data

Apr. 5, 2021  (JP) ................................. 2021-064157

(51) Int. Cl.
  *H01M 8/04858* (2016.01)
  *H01M 8/04992* (2016.01)
  (Continued)

(52) U.S. Cl.
  CPC ... *H01M 8/04873* (2013.01); *H01M 8/04552* (2013.01); *H01M 8/04559* (2013.01);
  (Continued)

(58) Field of Classification Search
  CPC ......... H01M 8/04313; H01M 8/04537–04686; H01M 8/04694; H01M 8/04858–04953
  See application file for complete search history.

(56) References Cited

U.S. PATENT DOCUMENTS

| 2009/0226771 | A1  | 9/2009 | Kaneko |
| 2010/0112401 | A1* | 5/2010 | Noto ................. H01M 8/04589 702/63 |
| 2013/0095402 | A1* | 4/2013 | Furuyama ......... H01M 8/04791 429/427 |

FOREIGN PATENT DOCUMENTS

| JP | 2007-12375 A | 1/2007 |
| JP | 2008-218100 A | 9/2008 |

(Continued)

OTHER PUBLICATIONS

Cha, S (2016). Fuel cell Fundamentals. (3rd ed.) (pp. 272-294, 346, 431-449). (Year: 2016).*

(Continued)

*Primary Examiner* — Jonathan Crepeau
*Assistant Examiner* — Jacob Buchanan
(74) *Attorney, Agent, or Firm* — HAUPTMAN HAM, LLP (57) ABSTRACT

A method of controlling a fuel battery system of the present disclosure is a method of controlling a fuel battery system, including a measurement process in which a power generation voltage at a predetermined current density of a fuel battery cell is measured, a first calculation process in which a poisoning rate of an electrode catalyst at the power generation voltage measured in the measurement process is calculated from a predetermined relationship between the power generation voltage at the predetermined current density and the poisoning rate of the electrode catalyst of the fuel battery cell, and a second calculation process in which a generation rate of hydrogen peroxide at the poisoning rate of the electrode catalyst calculated in the first calculation process is calculated from a predetermined relationship between the poisoning rate of the electrode catalyst and the generation rate of hydrogen peroxide of the fuel battery cell.

4 Claims, 5 Drawing Sheets

(51) Int. Cl.
  *H01M 8/04664* (2016.01)
  *H01M 8/04537* (2016.01)
(52) U.S. Cl.
  CPC ... *H01M 8/04589* (2013.01); *H01M 8/04679* (2013.01); *H01M 8/04686* (2013.01); *H01M 8/04992* (2013.01)

(56) References Cited

FOREIGN PATENT DOCUMENTS

| JP | 2018156747 A | * 10/2018 | ............ Y02E 60/50 |
|----|--------------|-----------|--------------------------|
| JP | 2020-181665 A | 11/2020 | |

OTHER PUBLICATIONS

Machine Translation of Imanishi (JP 2018-156747). Originally Published Oct. 4, 2018 (Year: 2018).*

* cited by examiner

METHOD OF CONTROLLING FUEL BATTERY SYSTEM

CROSS-REFERENCE TO RELATED APPLICATION

This application claims priority to Japanese Patent Application No. 2021-064157 filed on Apr. 5, 2021, incorporated herein by reference in its entirety.

BACKGROUND

1. Technical Field

The present disclosure relates to a method of controlling a fuel battery system.

2. Description of Related Art

In a fuel battery, during power generation, a side reaction ($2H^+ + O_2 + 2e^- \rightarrow H_2O_2$) occurs in addition to a main reaction ($2H^+ + 2e^- + (\frac{1}{2})O_2 \rightarrow H_2O$). Hydrogen peroxide ($H_2O_2$) generated during this side reaction reacts with Fe that has flowed as impurities into membrane electrode assemblies (MEA) to generate radicals. Radicals attack an electrolyte membrane, and an electrolyte material is destroyed. As a result, performance may deteriorate due to a decrease in conductivity of protons ($H^+$). In addition, as a result of excessive destruction of the electrolyte material, holes may be formed in the electrolyte membrane, and hydrogen may leak from an anode to a cathode, which results in a decrease in fuel consumption. In the least favorable case, a vehicle may stop running Various techniques have been proposed in order to avoid these problems.

For example, Japanese Unexamined Patent Application Publication No. 2007-12375 (JP 2007-12375 A) describes a method in which $Ti(SO_4)_2$ is added in advance to an electrolyte material, and thus attaches to, complexes with and removes hydrogen peroxide from a fuel battery cell. In addition, in Japanese Unexamined Patent Application Publication No. 2008-218100 (JP 2008-218100 A), a method in which a part of an edge of an electrolyte membrane whose surface is not covered with an electrode is covered with a sealing member and a peroxide decomposing catalyst is added to at least a portion of the sealing member covering the electrolyte membrane is described.

In methods described in JP 2007-12375 A, JP 2008-218100 A, and the like, after hydrogen peroxide is generated in the fuel battery cell, hydrogen peroxide is supplemented and removed from the cell, or hydrogen peroxide is decomposed, which makes hydrogen peroxide harmless. However, all of these methods involve taking measures after hydrogen peroxide is generated, and none involve taking measures before hydrogen peroxide is generated. In addition, since it is necessary to use a special additive in a cell in order to detoxify hydrogen peroxide, it is necessary to fully consider the adverse impact of its addition on cost and performance. In addition, when more hydrogen peroxide than expected is generated, since the amount of hydrogen peroxide generated cannot be diagnosed from the outside, it is unclear whether the amount of additives added before the fuel battery operates is appropriate as an amount required for sufficiently detoxifying hydrogen peroxide.

On the other hand, Japanese Unexamined Patent Application Publication No. 2020-181665 (JP 2020-181665 A) describes a method of controlling a fuel battery system in which, in a fuel battery cell, using two findings: 1) the generation rate of hydrogen peroxide is low when the poisoning rate of the electrode catalyst is less than a threshold value γ and 2) the poisoning rate of the electrode catalyst can be reduced by a potential fluctuation operation in which the potential of the fuel battery cell is repeatedly fluctuated between a high potential and a low potential, the generation of hydrogen peroxide itself is minimized. In this method, the poisoning rate of the electrode catalyst is estimated from curves of a reduction wave and an oxidation wave obtained by cyclic voltammetry, and when the poisoning rate of the electrode catalyst is a threshold value or more, it is estimated that the generation rate of hydrogen peroxide will have reached a specified value or more and will increase sharply. Therefore, in this case, the potential fluctuation operation in which the potential of the fuel battery cell is repeatedly fluctuated between a high potential and a low potential is performed, the poisoning rate of the electrode catalyst is reduced, and thus the generation rate of hydrogen peroxide of the electrode catalyst is reduced.

SUMMARY

However, in the method of controlling a fuel battery system described in JP 2020-181665 A, for example, it is necessary to connect an external measurement machine to the fuel battery cell at the time of vehicle shipping and at the time of vehicle testing, and then diagnose the poisoning rate of the electrode catalyst of the fuel battery cell measured by cyclic voltammetry using the external measurement machine. Such an operation of diagnosing the poisoning rate is complicated, and particularly troublesome at the time of vehicle shipping. Therefore, there is a demand for a method of estimating the generation rate of hydrogen peroxide more easily.

The present disclosure has been made in view of such circumstances, and an object of the present disclosure is to provide a method of controlling a fuel battery system in which a generation rate of hydrogen peroxide can be estimated more easily.

In order to address the above problems, there is provided a method of controlling a fuel battery system of the present disclosure, which is a method of controlling a fuel battery system, including a measurement process in which a power generation voltage at a predetermined current density of a fuel battery cell is measured, a first calculation process in which a poisoning rate of an electrode catalyst at the power generation voltage measured in the measurement process is calculated from a predetermined relationship between the power generation voltage at the predetermined current density and the poisoning rate of the electrode catalyst of the fuel battery cell, and a second calculation process in which a generation rate of hydrogen peroxide at the poisoning rate of the electrode catalyst calculated in the first calculation process is calculated from a predetermined relationship between the poisoning rate of the electrode catalyst and the generation rate of hydrogen peroxide of the fuel battery cell.

According to the fuel battery system of the present disclosure, it is possible to estimate the generation rate of hydrogen peroxide more easily.

In the fuel battery system, the method may further include a potential fluctuation operation process in which, when the generation rate of hydrogen peroxide calculated in the second calculation process is a specified value α or more, a potential fluctuation operation in which the potential of the fuel battery cell is repeatedly fluctuated between a high potential and a low potential is performed.

According to the present disclosure, it is possible to estimate the generation rate of hydrogen peroxide more easily.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a method of controlling a fuel battery system according to an embodiment of the present disclosure will be described.

A method of controlling a fuel battery system according to an embodiment is a method of controlling a fuel battery system, including a measurement process in which a power generation voltage at a predetermined current density of a fuel battery cell is measured, a first calculation process in which a poisoning rate of an electrode catalyst at the power generation voltage measured in the measurement process is calculated from a predetermined relationship between the power generation voltage at the predetermined current density and the poisoning rate of the electrode catalyst of the fuel battery cell, and a second calculation process in which a generation rate of hydrogen peroxide at the poisoning rate of the electrode catalyst calculated in the first calculation process is calculated from a predetermined relationship between the poisoning rate of the electrode catalyst and the generation rate of hydrogen peroxide of the fuel battery cell.

First, an overview of the method of controlling a fuel battery system according to the embodiment will be described by exemplifying one embodiment.

(Fuel Battery System)

Figure 1:
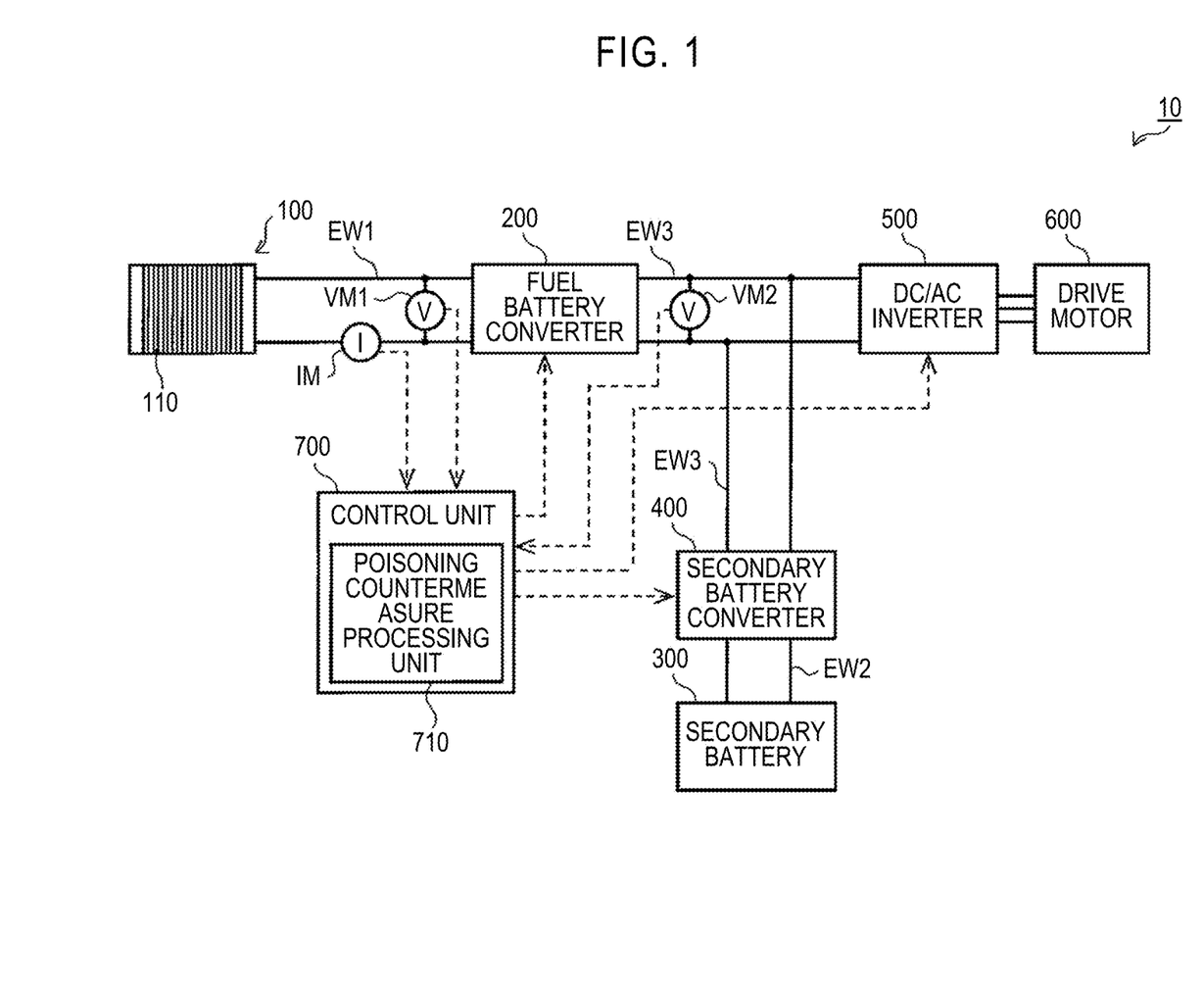
FIG. 1 is a schematic configuration diagram showing a fuel battery system that performs a method of controlling a fuel battery system according to one embodiment.

Before describing the method of controlling a fuel battery system according to one embodiment, a fuel battery system that performs the control method will be described. FIG. 1 is a schematic configuration diagram showing a fuel battery system that performs a method of controlling a fuel battery system according to one embodiment.

As shown in FIG. 1, a fuel battery system 10 according to one embodiment includes a fuel battery 100, a fuel battery converter 200, a secondary battery 300, a secondary battery converter 400, a DC/AC inverter 500, a drive motor 600, and a control unit 700.

The fuel battery system 10 further includes a fuel battery conductive wire EW1, a secondary battery conductive wire EW2, and a DC conductive wire EW3. The fuel battery conductive wire EW1 electrically connects the fuel battery 100 and the fuel battery converter 200. The secondary battery conductive wire EW2 electrically connects the secondary battery 300 and the secondary battery converter 400. The DC conductive wire EW3 connects the fuel battery converter 200 and the secondary battery converter 400 in parallel with the DC/AC inverter 500.

The fuel battery 100 is a solid polymer fuel battery, and generates DC power. The fuel battery 100 generates power by reacting hydrogen gas and oxygen gas supplied from the outside in a fuel battery cell 110 according to an electrochemical reaction. The power generated by the fuel battery 100 is input to the fuel battery converter 200, the secondary battery converter 400 and the DC/AC inverter 500 via the fuel battery conductive wire EW1. Here, although not shown, the fuel battery system 10 further includes a gas supply unit that supplies hydrogen gas to the fuel battery cell 110 from the outside and can adjust the amount of hydrogen gas supplied and a gas supply unit that supplies oxygen gas to the fuel battery cell 110 from the outside and can adjust the amount of oxygen gas supplied.

The fuel battery 100 has a stack structure in which a plurality of the same fuel battery cells 110, which are unit modules for power generation, are laminated. Each fuel battery cell 110 has an electrolyte membrane composed of a polymer ion exchange membrane. Each fuel battery cell 110 has, for example, an anode electrode on one side of the electrolyte membrane and a cathode electrode on the other side of the electrolyte membrane. The anode electrode is a reaction field in which an electrode reaction on the anode side proceeds and contains a catalyst that promotes the electrode reaction in the vicinity of a contact surface with the electrolyte membrane. The cathode electrode is a reaction field in which an electrode reaction on the cathode side proceeds and contains a catalyst in the vicinity of a contact surface with the electrolyte membrane as in the anode electrode. Here, the "electrode catalyst" is a catalyst of the cathode electrode.

The fuel battery converter 200 is a booster converter that boosts the voltage input from the fuel battery 100 to a target voltage and outputs it. The fuel battery converter 200 is electrically connected to the DC/AC inverter 500 via the DC conductive wire EW3.

The secondary battery 300 functions as a power source of the fuel battery system 10 together with the fuel battery 100. The secondary battery 300 charges the power generated by the fuel battery 100. In addition, the secondary battery 300 inputs the charged power to the drive motor 600. The secondary battery 300 is composed of a lithium ion battery. The secondary battery 300 may be another type of battery such as a lead storage battery, a nickel cadmium battery, and a nickel metal hydride battery.

The secondary battery converter 400 is an elevating type converter device, and has a configuration similar to that of the fuel battery converter 200. The secondary battery converter 400 adjusts the voltage of the secondary battery conductive wire EW2 and controls charging and discharging of the secondary battery 300. When the output power of the fuel battery converter 200 is insufficient with respect to the target, the secondary battery converter 400 discharges the secondary battery 300. On the other hand, when the drive motor 600 generates regenerative power, the secondary battery converter 400 causes the secondary battery 300 to charge regenerative power. Here, the secondary battery converter 400 may have a configuration different from that of the fuel battery converter 200.

The DC/AC inverter 500 converts the DC power supplied from the fuel battery 100 and the secondary battery 300 via the DC conductive wire EW3 into three-phase AC power. The DC/AC inverter 500 is electrically connected to the drive motor 600 via an AC conductive wire and supplies the three-phase AC power to the drive motor 600. In addition, the DC/AC inverter 500 converts the regenerative power generated by the drive motor 600 into DC power according to an instruction from the control unit 700 and then inputs the result to the secondary battery 300 via the DC conductive wire EW3.

The drive motor 600 constitutes a main power source of the fuel battery system 10. The drive motor 600 is an electric motor that converts the three-phase AC power supplied from the DC/AC inverter 500 into rotating power.

The fuel battery system 10 further includes a first voltage measurement unit VM1, a current measurement unit IM, and a second voltage measurement unit VM2. The first voltage measurement unit VM1 and the current measurement unit IM are installed in the fuel battery conductive wire EW1. The second voltage measurement unit VM2 is installed in the DC conductive wire EW3. The first voltage measurement unit VM1 measures an output voltage of the fuel battery 100 and inputs the measured output voltage as a signal to the control unit 700. The current measurement unit IM measures an output current of the fuel battery 100 and inputs the measured output current as a signal to the control unit 700. The second voltage measurement unit VM2 measures an output voltage of the fuel battery converter 200 and inputs the measured output voltage as a signal to the control unit 700.

The control unit 700 controls each component of the fuel battery system 10. The control unit 700 includes a poisoning countermeasure processing unit 710 as a functional unit that controls each component of the fuel battery system 10. In a method of controlling a fuel battery system to be described below, the poisoning countermeasure processing unit 710 of the control unit 700 calculates a poisoning rate of the electrode catalyst based on the output voltage of the fuel battery 100. The poisoning countermeasure processing unit 710 calculates a generation rate of hydrogen peroxide based on the calculated poisoning rate of the electrode catalyst. The poisoning countermeasure processing unit 710 performs determination for determining whether or not to perform a potential fluctuation operation based on the calculated generation rate of hydrogen peroxide. The poisoning countermeasure processing unit 710 performs a potential fluctuation operation based on the output voltage and the output current of the fuel battery 100 depending on the determination result.

(Poisoning Rate of Electrode Catalyst of Fuel Battery Cell)

Figure 2:
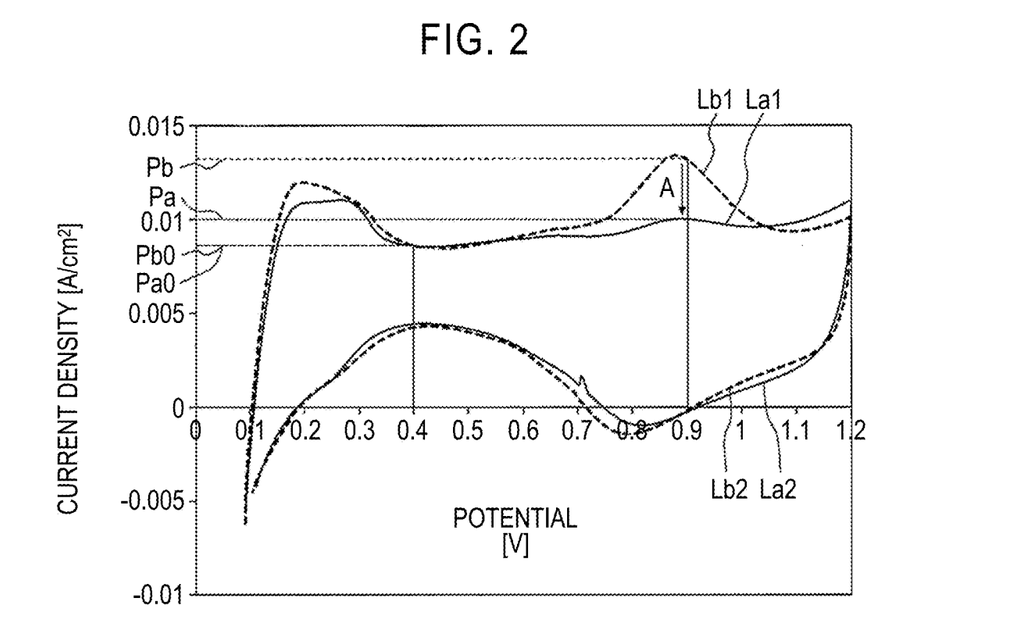
FIG. 2 is a graph showing a poisoning rate of an electrode catalyst of a fuel battery cell according to one embodiment.

Next, a poisoning rate of an electrode catalyst of the fuel battery cell 110 according to one embodiment will be described. FIG. 2 is a graph showing a poisoning rate of an electrode catalyst of a fuel battery cell according to one embodiment.

FIG. 2 shows the change in the current density when the potential of the fuel battery cell measured by cyclic voltammetry is swept. In FIG. 2, La1 and La2 are curves showing the current density when the electrode catalyst of the fuel battery cell 110 is poisoned with poisoning causative substances such as organic components, La1 shows a reduction wave generated when the potential of the fuel battery cell 110 is swept from a high potential to a low potential, and La2 shows an oxidation wave generated when the potential of the fuel battery cell 110 is swept from a low potential to a high potential. On the other hand, Lb1 and Lb2 are curves showing the current density when the electrode catalyst of the fuel battery cell 110 is not poisoned, Lb1 shows a reduction wave generated when the potential of the fuel battery cell 110 is swept from a high potential to a low potential, and Lb2 shows an oxidation wave generated when the potential of the fuel battery cell 110 is swept from a low potential to a high potential.

As shown in FIG. 2, in Lb1, the current density reaches the maximum when the potential of the fuel battery cell 110 is around 0.9 V. The potential when the current density is the maximum is a potential at which the adsorption rate of oxygen required for power generation with respect to the electrode catalyst of the fuel battery cell 110 is the maximum. When the electrode catalyst of the fuel battery cell 110 is poisoned with poisoning causative substances such as organic components, adsorption of oxygen to the electrode catalyst is inhibited. Thereby, in La1, the current density when the potential of the fuel battery cell 110 is 0.9 V is reduced as indicated by the arrow A as compared with Lb1. The poisoning rate of the electrode catalyst of the fuel battery cell 110 can be estimated based on the amount of decrease in the current density indicated by the arrow A. On the other hand, in La1 and Lb1, when the potential of the fuel battery cell 110 is around 0.4 V, the adsorption rate of oxygen with respect to the electrode catalyst of the fuel battery cell 110 is the minimum.

Here, the state in which the electrode catalyst of the fuel battery cell 110 is not poisoned is a state when potential fluctuation is repeated until the number of cycles reaches 100, and the current density when the potential of the fuel battery cell 110 is around 0.9 V is saturated when a potential fluctuation operation to be described below is performed from one state in which the electrode catalyst of the fuel battery cell 110 is poisoned (the state in which the poisoning rate of the electrode catalyst is 70% as described below).

As described above, the poisoning rate of the electrode catalyst of the fuel battery cell 110 is defined by Formula (1) when Pa is a current density when the potential at La1 is 0.9 V, Pa0 is a current density when the potential at La1 is 0.4 V, Pb is a current density when the potential at Lb1 is 0.9 V, and Pb0 is a current density when the potential at Lb1 is 0.4 V.

$$\text{Poisoning rate of electrode catalyst} = (1-(Pa-Pa0)/(Pb-Pb0)) \times 100 \quad (1)$$

Pa0 and Pb0 are determined by characteristics of the electrode catalyst itself of the fuel battery cell 110, and are constant regardless of whether the electrode catalyst is poisoned. In addition, Pb is constant because it is the current density when the electrode catalyst of the fuel battery cell 110 is not poisoned. On the other hand, Pa decreases with respect to Pb as poisoning of the electrode catalyst of the fuel battery cell 110 proceeds. Therefore, while the difference (Pb−Pb0) obtained by subtracting Pb0 from Pb is constant, the difference (Pa−Pa0) obtained by subtracting Pa0 from Pa decreases as poisoning of the electrode catalyst of the fuel battery cell 110 proceeds. Therefore, the poisoning rate of the electrode catalyst defined by Formula (1) is 0% when the electrode catalyst of the fuel battery cell 110 is not poisoned, and increases as poisoning of the electrode catalyst proceeds.

Here, Pa and Pb are not particularly limited as long as they are current densities at which the poisoning rate of the electrode catalyst can be specified, and may be current densities at which the potentials at La1 and Lb1 are around 0.9 V, and thus may be current densities when the potential is a value other than 0.9 V (for example, 0.85 V). Similarly, Pa0 and Pb0 are not particularly limited as long as they are current densities at which the poisoning rate of the electrode catalyst can be specified, and may be current densities when the potentials at La1 and Lb1 are around 0.4 V, and thus may be current densities when the potential is a value other than 0.4 V (for example, 0.3 V).

(Method of Controlling Fuel Battery System)

Figure 3:
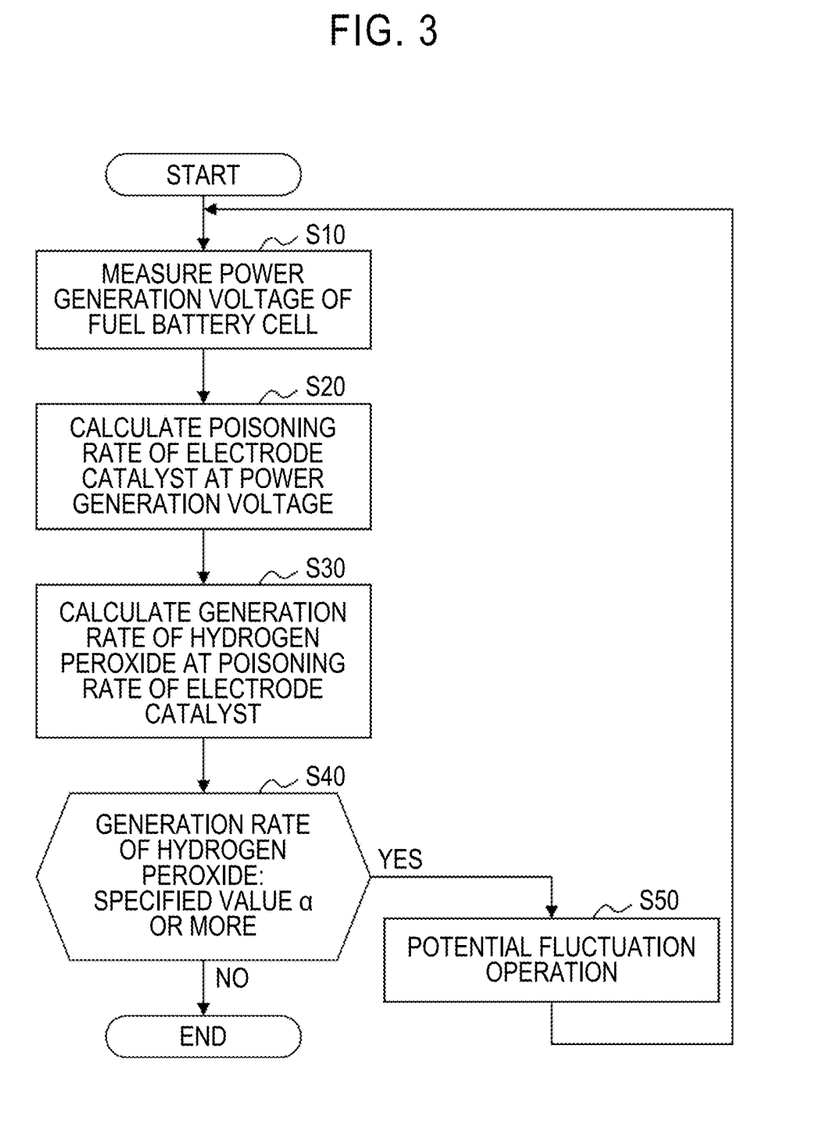
FIG. 3 is a flowchart illustrating a method of controlling a fuel battery system according to one embodiment.

Next, a method of controlling a fuel battery system according to one embodiment will be described. FIG. 3 is a flowchart illustrating the method of controlling a fuel battery system according to one embodiment.

In the method of controlling a fuel battery system according to one embodiment, first, as shown in FIG. 3, by in-line, a power generation voltage at a predetermined current density (for example, 2.0 A/cm$^2$) in a predetermined operation state of the fuel battery cell 110 is measured (measurement process S10).

Specifically, in the measurement process S10, the poisoning countermeasure processing unit 710 of the control unit 700 controls the fuel battery system 10 in response to an output request, and adjusts the amount of hydrogen gas and oxygen gas supplied to the fuel battery cell 110, and thus the current density of the output current of the fuel battery 100 measured by the current measurement unit IM is swept to the predetermined current density, and in this case, a power generation voltage of the fuel battery cell 110 is determined from the output voltage of the fuel battery 100 measured by the first voltage measurement unit VM1. In this case, the power generation voltage of the fuel battery cell 110 is calculated by the poisoning countermeasure processing unit 710 by dividing the output voltage of the fuel battery 100 by the number of fuel battery cells 110 laminated.

Next, as shown in FIG. 3, the poisoning rate of the electrode catalyst at the power generation voltage measured in the measurement process S10 is calculated from a predetermined relationship between the power generation voltage at the predetermined current density and the poisoning rate of the electrode catalyst in the predetermined operation state of the fuel battery cell 110 (first calculation process S20).

Specifically, the poisoning countermeasure processing unit 710 of the control unit 700 stores the relationship between the power generation voltage at the predetermined current density and the poisoning rate of the electrode catalyst in the predetermined operation state of the fuel battery cell 110 in advance as first control information. In the first calculation process S20, the poisoning countermeasure processing unit 710 calculates the poisoning rate of the electrode catalyst at the power generation voltage measured in the measurement process S10 from the first control information.

Figure 4:
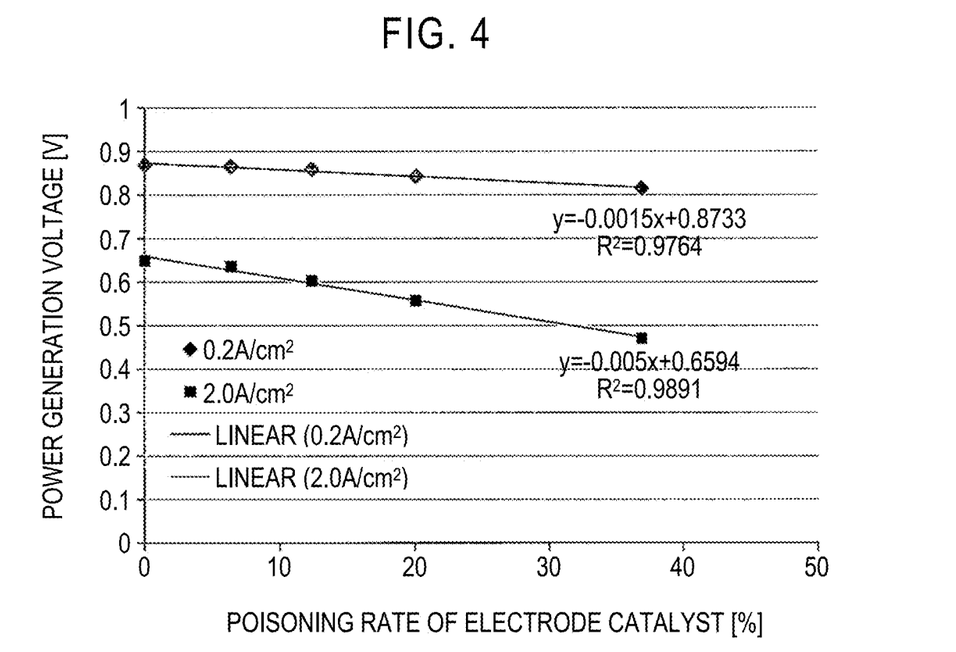
FIG. 4 is a graph showing an example of a predetermined relationship between a power generation voltage at a predetermined current density and a poisoning rate of an electrode catalyst in a predetermined operation state of a fuel battery cell according to one embodiment.

Here, FIG. 4 is a graph showing an example of a predetermined relationship between the power generation voltage at the predetermined current density and the poisoning rate of the electrode catalyst in a predetermined operation state of the fuel battery cell according to one embodiment. FIG. 4 shows a predetermined relationship between the power generation voltage at a current density of 0.2 A/cm$^2$ and 2.0 A/cm$^2$ and the poisoning rate of the electrode catalyst in an operation state of the fuel battery cell 110 at a relative humidity of 165% RH. The relationship between the power generation voltage and the poisoning rate of the electrode catalyst has a very good correlation. The relationship between the power generation voltage at the predetermined current density and the poisoning rate of the electrode catalyst of the fuel battery cell 110 changes depending on the material, the relative humidity, and the temperature of the fuel battery cell 110 and the operation state determined by conditions such as the configuration of the fuel battery system 10. Therefore, the poisoning countermeasure processing unit 710 of the control unit 700 stores first control information (the relationship between the power generation voltage at the predetermined current density and the poisoning rate of the electrode catalyst of the fuel battery cell 110) in advance for each operation state, and thus can appropriately select and use the first control information according to the operation state.

Next, as shown in FIG. 3, the generation rate of hydrogen peroxide at the poisoning rate of the electrode catalyst calculated in the first calculation process S20 is calculated from the predetermined relationship between the poisoning rate of the electrode catalyst of the fuel battery cell 110 and the generation rate of hydrogen peroxide ($H_2O_2$) (second calculation process S30).

Specifically, the poisoning countermeasure processing unit 710 of the control unit 700 stores the relationship between the poisoning rate of the electrode catalyst at the predetermined current density and the generation rate of hydrogen peroxide in the predetermined operation state of the fuel battery cell 110 in advance as second control information. In the second calculation process S30, the poisoning countermeasure processing unit 710 calculates a generation rate of hydrogen peroxide at the poisoning rate of the electrode catalyst calculated in the first calculation process S20 from the second control information.

Here, the "generation rate of hydrogen peroxide" is a value [%] obtained by multiplying a result obtained by dividing an amount of hydrogen peroxide generated [mol] by a sum of an amount of water generated by power generation [mol] and an amount of hydrogen peroxide generated [mol] by 100.

Figure 5:
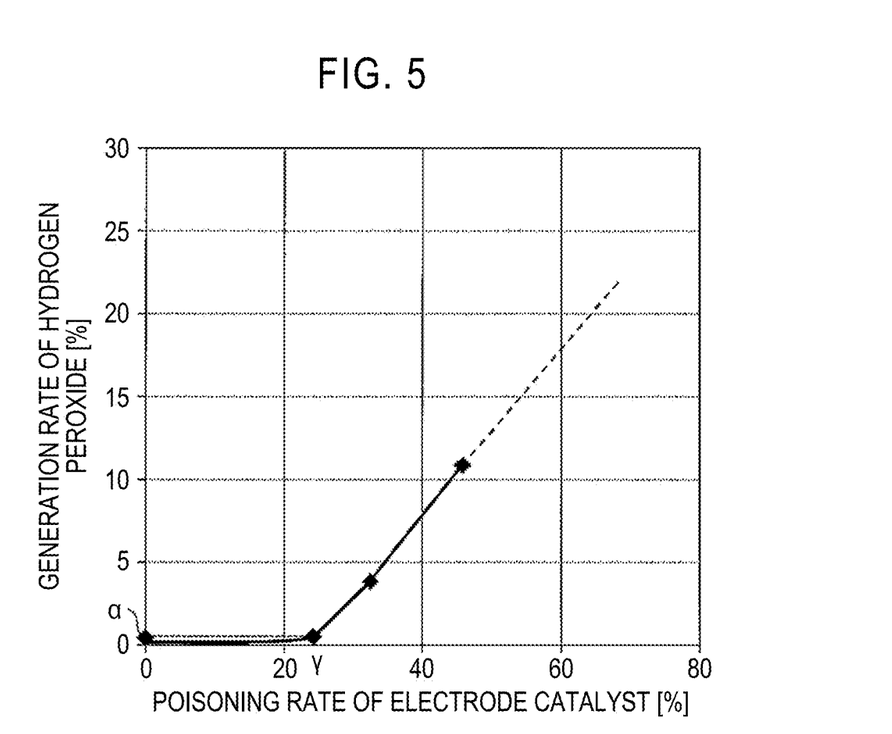
FIG. 5 is a graph showing an example of a predetermined relationship between a poisoning rate of an electrode catalyst at a predetermined current density and a generation rate of hydrogen peroxide in a predetermined operation state of a fuel battery cell according to one embodiment.

Here, FIG. 5 is a graph showing an example of a predetermined relationship between the poisoning rate of the electrode catalyst at a predetermined current density and the generation rate of hydrogen peroxide in a predetermined operation state of the fuel battery cell according to one embodiment. FIG. 5 shows a predetermined relationship between the poisoning rate of the electrode catalyst at a current density of 0.2 A/cm$^2$ and the generation rate of hydrogen peroxide in an operation state of the fuel battery cell 110 at a relative humidity of 165% RH. The relationship between the poisoning rate of the electrode catalyst at a predetermined current density of the fuel battery cell 110 and the generation rate of hydrogen peroxide changes depending on the operation state of the fuel battery cell 110. Therefore, the poisoning countermeasure processing unit 710 of the control unit 700 stores second control information (the relationship between the poisoning rate of the electrode catalyst at the predetermined current density of the fuel battery cell 110 and the generation rate of hydrogen peroxide) in advance for each operation state, and thus can appropriately select and use second control information according to the operation state.

According to one embodiment, for example, in an inspection at the time of vehicle shipping and at the time of vehicle testing, since the generation rate of hydrogen peroxide of the fuel battery cell 110 can be estimated from the power generation voltage of the fuel battery cell 110, which can be measured in-line as described above, the generation rate of hydrogen peroxide of the fuel battery cell 110 can be estimated more easily (effect 1). In addition, for example, in the current density in a wide range such as 0.2 A/cm$^2$ to 2.0 A/cm$^2$, since the relationship between the power generation voltage of the fuel battery cell 110 and the poisoning rate of the electrode catalyst has a very good correlation, the generation rate of hydrogen peroxide can be estimated in a wide range of current density, and the vehicle inspection process can be simplified (effect 2).

In the control method according to one embodiment, next, as shown in FIG. 3, it is determined whether the generation rate of hydrogen peroxide calculated in the second calculation process S30 is a predetermined specified value α or more (determination process S40). Specifically, the poisoning countermeasure processing unit 710 of the control unit 700 stores the specified value α in advance. The poisoning countermeasure processing unit 710 determines whether the generation rate of hydrogen peroxide calculated in the second calculation process S30 is a specified value α or more.

Here, a predetermined specified value α for the generation rate of hydrogen peroxide of the fuel battery cell 110 will be described. As in the example shown in FIG. 5, the generation rate of hydrogen peroxide is slight when the poisoning rate of the electrode catalyst is less than a threshold value γ. On the other hand, when the poisoning rate of the electrode catalyst is a threshold value γ or more, the generation rate of hydrogen peroxide increases sharply as the poisoning rate of the electrode catalyst increases. The specified value α is a value of the generation rate of hydrogen peroxide when the poisoning rate of the electrode catalyst is a threshold value γ. The specified value α changes depending on the current density and the operation state of the fuel battery cell 110. Therefore, the poisoning countermeasure processing unit 710 of the control unit 700 stores the specified value α for each current density and operation state in advance, and can appropriately select and use the specified value α depending on the current density and the operation state of the fuel battery 100.

Next, as shown in FIG. 3, when the generation rate of hydrogen peroxide calculated in the second calculation process S30 is a specified value α or more, a potential fluctuation operation in which the potential of the fuel battery cell 110 is repeatedly fluctuated between a high potential and a low potential is performed (potential fluctuation operation process S50). Here, the "potential of the fuel battery cell" is a potential of the cathode electrode with respect to the anode electrode of the fuel battery cell.

Specifically, in the potential fluctuation operation process S50, the poisoning countermeasure processing unit 710 of the control unit 700 performs a potential fluctuation operation when it is determined in the determination process S40 that the generation rate of hydrogen peroxide is a specified value α or more. After the potential fluctuation operation process S50, the poisoning countermeasure processing unit 710 performs the measurement process S10 again. On the other hand, as shown in FIG. 3, the poisoning countermeasure processing unit 710 ends control of the fuel battery system when it is determined in the determination process S40 that the generation rate of hydrogen peroxide is not a specified value α or more.

Figure 6:
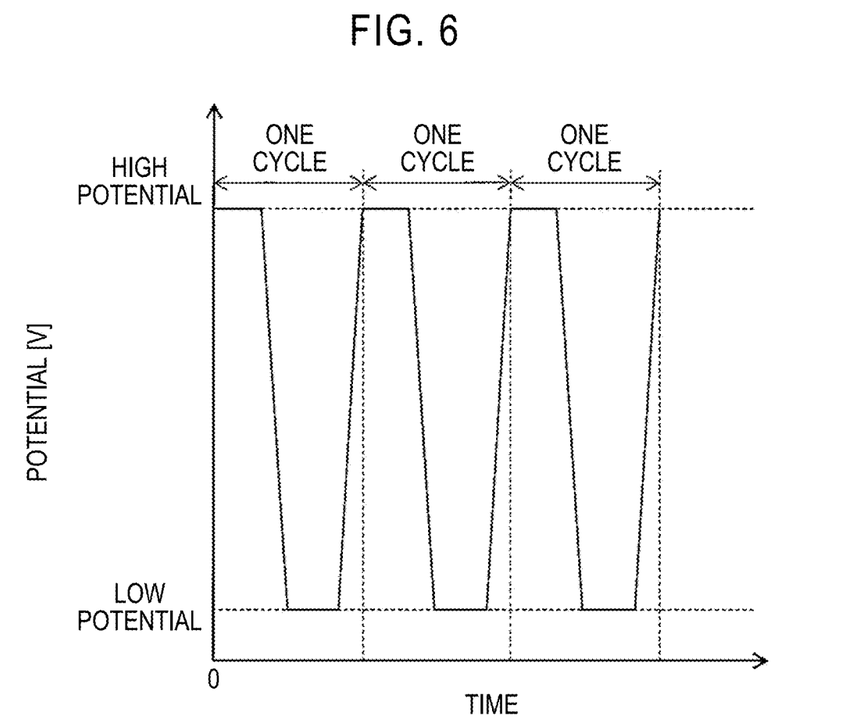
FIG. 6 is a graph showing potential fluctuation of a fuel battery cell in a potential fluctuation operation according to one embodiment.

Hereinafter, a potential fluctuation operation according to one embodiment will be described. FIG. 6 is a graph showing potential fluctuation of the fuel battery cell in a potential fluctuation operation according to one embodiment.

In the potential fluctuation operation, the potential of the fuel battery cell 110 is repeatedly fluctuated between a high potential and a low potential. Specifically, the poisoning countermeasure processing unit 710 of the control unit 700 controls the fuel battery system 10 and adjusts the amount of hydrogen gas and oxygen gas supplied to the fuel battery cell 110, and thus fluctuates the output current and the output voltage of the fuel battery 100 measured by the current measurement unit IM and the first voltage measurement unit VM1 so that the potential of the fuel battery cell 110 is repeatedly fluctuated between a high potential (for example, 0.9 V) and a low potential (for example, 0.1 V) and as shown in FIG. 6. Thereby, when the potential of the fuel battery cell 110 is high, poisoning causative substances such as organic components adhered to the electrode catalyst are oxidized and removed, and when the potential of the fuel battery cell 110 is low, an adhesive force of the poisoning causative substances with respect to the electrode catalyst is reduced, the current output from the fuel battery cell 110 increases, the amount of water generated in the fuel battery cell 110 increases, and as a result, an action of washing away the poisoning causative substances with the generated water is improved. Therefore, the poisoning rate of the electrode catalyst of the fuel battery cell 110 can be reduced. As a result, the generation rate of hydrogen peroxide of the fuel battery cell 110 can be reduced. Thereby, it is possible to reduce damage to the electrolyte membrane.

The high potential of the potential fluctuation of the fuel battery cell 110 is not particularly limited as long as an action of removing poisoning causative substances such as organic components is obtained, and is preferably, for example, in a range of 0.8 V or more and 1.0 V or less. This is because the poisoning rate of the electrode catalyst can be effectively reduced when the high potential is equal to or higher than the lower limit of this range. This is because deterioration of the electrode catalyst can be reduced when the high potential is equal to or less than the upper limit of this range. The low potential when the potential of the fuel battery cell 110 is repeatedly fluctuated is not particularly limited as long as an action of removing poisoning causative substances such as organic components is obtained, and is preferably, for example, in a range of 0.1 V or more and 0.2 V or less. This is because it is possible to prevent the amount of water generated from becoming excessive when the low potential is equal to or higher than the lower limit of this range. This is because an action of washing away the poisoning causative substances with the generated water can be effectively improved when the low potential is equal to or less than the upper limit of this range.

Figure 7:
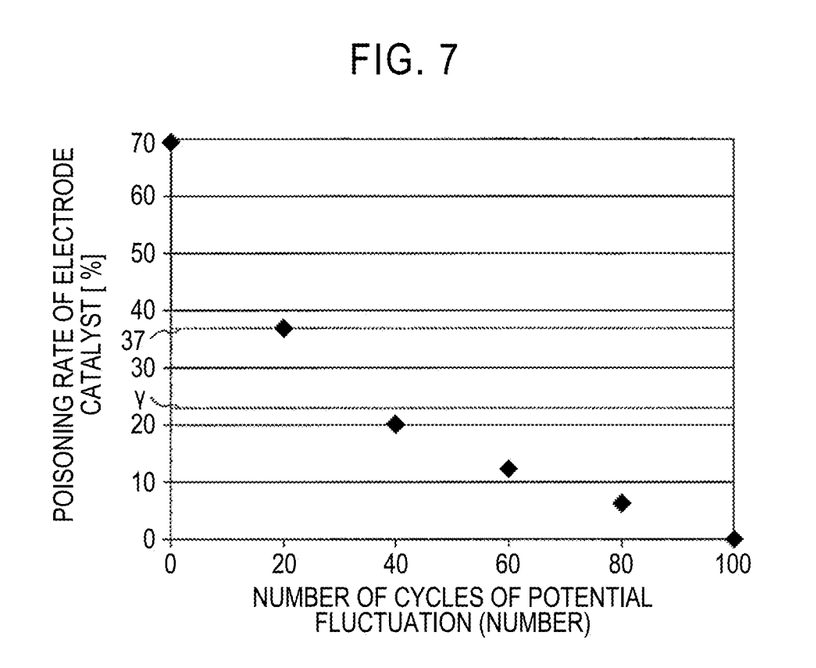
FIG. 7 is a graph showing an example of a relationship between the number of cycles of potential fluctuation and a poisoning rate of an electrode catalyst in a fuel battery cell according to one embodiment.

Here, FIG. 7 is a graph showing an example of the relationship between the number of cycles of potential fluctuation and the poisoning rate of the electrode catalyst of the fuel battery cell according to one embodiment. FIG. 7 shows the relationship between the number of cycles of potential fluctuation of the fuel battery cell 110 from an initial state in which the poisoning rate of the electrode catalyst of the fuel battery cell 110 is 70% and the poisoning rate of the electrode catalyst.

As shown in FIG. 7, the poisoning rate of the electrode catalyst of the fuel battery cell 110 decreases in inverse proportion to the number of cycles of potential fluctuation. Then, the poisoning rate of the electrode catalyst of the fuel battery cell 110 decreases to 0% when the number of cycles of potential fluctuation is 100. In addition, it is found from the relationship shown in FIG. 7 that, in order to reduce the poisoning rate of the electrode catalyst of the fuel battery cell 110 from 37% to 20%, which is less than the threshold value γ, it is necessary to set the number of cycles of potential fluctuation of the fuel battery cell 110 to 20.

The time of one cycle of the potential fluctuation in which the potential of the fuel battery cell 110 is repeatedly fluctuated is not particularly limited as long as an action of removing poisoning causative substances such as organic components is obtained, and is preferably, for example, in a range of 3 seconds or more and 10 seconds or less. This is because an action of removing poisoning causative substances becomes effective when the time of one cycle of the potential fluctuation is within this range.

While the method of controlling a fuel battery system according to the embodiment of the present disclosure has been described in detail above, the present disclosure is not limited to the embodiment, and various design modifications can be made without departing from the spirit and scope of the present disclosure described in the claims.

What is claimed is:

1. A method of controlling a fuel battery system, comprising:
    a measurement process in which a current density of a fuel battery cell is swept to a predetermined current density and a power generation voltage at the predetermined current density of the fuel battery cell is measured, the predetermined current density being in a range of 0.2 A/cm$^2$ to 2.0 A/cm$^2$;
    a first calculation process in which a poisoning rate of an electrode catalyst at the power generation voltage measured in the measurement process is calculated from a predetermined relationship between the power generation voltage at the predetermined current density and the poisoning rate of the electrode catalyst of the fuel battery cell; and
    a second calculation process in which a generation rate of hydrogen peroxide at the poisoning rate of the electrode catalyst calculated in the first calculation process is calculated from a predetermined relationship between the poisoning rate of the electrode catalyst and the generation rate of hydrogen peroxide of the fuel battery cell,
    wherein when the generation rate of hydrogen peroxide calculated in the second calculation process is a specified value or more, a potential fluctuation operation in which a potential of the fuel battery cell is repeatedly fluctuated between a high potential and a low potential is performed.

2. The method according to claim 1, further comprising:
    determining, based on at least one of a material, a relative humidity, or a temperature of the fuel battery cell, a relationship between the power generation voltage at the predetermined current density and the poisoning rate of the electrode catalyst in a predetermined operation state of the fuel battery cell, as the predetermined relationship between the power generation voltage at the predetermined current density and the poisoning rate of the electrode catalyst of the fuel battery cell.

3. The method according to claim 2, further comprising:
    storing the predetermined relationship between the power generation voltage at the predetermined current density and the poisoning rate of the electrode catalyst of the fuel battery cell in advance as first control information, wherein
    in the first calculation process, the poisoning rate of the electrode catalyst at the power generation voltage measured in the measurement process is calculated from the first control information.

4. The method according to claim 3, further comprising:
    storing the predetermined relationship between the poisoning rate of the electrode catalyst and the generation rate of hydrogen peroxide of the fuel battery cell, which is a relationship between the poisoning rate of the electrode catalyst at the predetermine current density and the generation rate of hydrogen peroxide of the fuel battery cell in the predetermined operation state, in advance as second control information, wherein
    in the second calculation process, the generation rate of hydrogen peroxide at the poisoning rate of the electrode catalyst calculated in the first calculation process is calculated from the second control information.

* * * * *